United States Patent
Takori et al.

(10) Patent No.: US 12,344,161 B2
(45) Date of Patent: Jul. 1, 2025

(54) VEHICLE BRAKE LAMP

(71) Applicant: HONDA MOTOR CO., LTD., Tokyo (JP)

(72) Inventors: Masayoshi Takori, Wako (JP); Yuji Tsuchiya, Wako (JP); Kei Oshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/585,122

(22) Filed: Feb. 23, 2024

(65) Prior Publication Data

US 2024/0308421 A1 Sep. 19, 2024

(30) Foreign Application Priority Data

Mar. 17, 2023 (JP) .................................. 2023-043182

(51) Int. Cl.
*B60Q 1/44* (2006.01)
(52) U.S. Cl.
CPC .................................. *B60Q 1/444* (2013.01)

(58) Field of Classification Search
CPC ...... B60Q 1/444; B60Q 1/2607; B60Q 1/302; B60Q 1/441; B60Q 1/44; B60Q 1/447
See application file for complete search history.

(56) References Cited

U.S. PATENT DOCUMENTS 9,855,889 B1 * 1/2018 Mullis .................... B60Q 1/444

FOREIGN PATENT DOCUMENTS

JP 2002-052977 2/2022

* cited by examiner

*Primary Examiner* — William J Carter
(74) *Attorney, Agent, or Firm* — Amin, Turocy & Watson, LLP

(57) ABSTRACT

A vehicle brake lamp includes a plurality of striped light emitting regions 15 and a plurality of non-light emitting regions 16. In each of the striped light emitting regions 15, a plurality of strip-shaped light emitting portions 13 and non-light emitting portions 14 are alternately disposed. The non-light emitting regions 16 does not have a light emitting portion. The striped light emitting regions 15 and the non-light emitting regions 16 are alternately disposed. An extension width w1 of each of the non-light emitting regions 16 in a disposition direction is set to be larger than an extension width w2 of each of the non-light emitting portions 14 in the striped light emitting region 15 in a disposition direction.

5 Claims, 5 Drawing Sheets

DECELERATION : SMALL

DECELERATION : MEDIUM

DECELERATION : LARGE

DECELERATION : SMALL

DECELERATION : MEDIUM

DECELERATION : LARGE

VEHICLE BRAKE LAMP

CROSS-REFERENCE TO RELATED APPLICATION

Priority is claimed on Japanese Patent Application No. 2023-43182 filed on Mar. 17, 2023, the content of which is incorporated herein by reference.

BACKGROUND OF THE INVENTION

Field of the Invention

The present invention relates to a vehicle brake lamp disposed at a rear part of a vehicle.

Description of Related Art

A brake lamp disposed at a rear part of a vehicle lights up in conjunction with an operation of a brake device. Thereby, a braking situation of a preceding vehicle can be informed to a following vehicle. Since it is important for a brake lamp to make a lighting state more clearly recognizable to a following vehicle, various types of design have been made for this purpose (for example, see Japanese Unexamined Patent Application, First Publication No. 2002-52977).

In a vehicle brake lamp described in Japanese Unexamined Patent Application, First Publication No. 2002-52977, strip-shaped high intensity light emitting portions and low intensity light emitting portions are alternately disposed on a light emitting surface. Thereby, when a brake device is operated (braking), the brake lamp appears to shine in a stripe pattern, and this can make lighting of the lamp clearly recognizable to a driver of a following vehicle.

Generally, a stripe pattern with a contrast such as that on a railroad crossing barrier can raise a viewer's awareness of a warning of a danger. Therefore, the above-described brake lamp that lights up in a stripe pattern can draw the attention of a driver in a following vehicle when the brake device is operated.

SUMMARY OF THE INVENTION

In the conventional vehicle brake lamp described above, the entire light emitting surface appears to light up in a substantially uniform stripe pattern. Therefore, when a following vehicle has approached to within a certain distance, a driver of the following vehicle can recognize the stripe lighting of the light emitting surface. However, if the following vehicle is at a distance of more than a certain distance, although the lighting itself of the light emitting surface can be visually recognized, it is not possible to recognize the lighting situation with a stripe pattern. Therefore, a viewer's awareness of a warning cannot be sufficiently raised by the stripe lighting, and an improvement in this point is desired.

Therefore, an objective of the present invention is to provide a vehicle brake lamp that can make a driver of a following vehicle reliably recognize a lighting situation with a stripe pattern during braking regardless of a separation distance from the following vehicle. Furthermore, this contributes to a development of a sustainable transportation system.

A vehicle brake lamp according to the present invention employs the following configurations.

That is, a vehicle brake lamp according to the present invention, which is a vehicle brake lamp disposed at a rear part of a vehicle, includes a plurality of striped light emitting regions in which a plurality of strip-shaped light emitting portions and non-light emitting portions are alternately disposed, and a plurality of non-light emitting regions without a light emitting portion, in which the striped light emitting regions and the non-light emitting regions are alternately disposed, and an extension width of each of the non-light emitting regions in a disposition direction is set to be larger than an extension width of each of the non-light emitting portions in the striped light emitting region in a disposition direction.

When the above-described configuration is employed, when the light emitting portions of the plurality of striped light emitting regions emit light when a following vehicle is at a distance, it appears to a driver of the following vehicle that the striped light emitting regions and the non-light emitting regions light up in a stripe pattern as a whole. Therefore, even when the following vehicle is at a distance, it is possible to sufficiently raise an awareness of a warning of a driver in the following vehicle who visually recognizes the vehicle brake lamp.

Also, when the light emitting portions of the striped light emitting region emit light when the following vehicle is approaching, the light emitting portions and the non-light emitting portions within the striped light emitting region appear to light up in a stripe pattern to the driver of the following vehicle. Therefore, also in this case, an awareness of a warning of the driver in the following vehicle who visually recognizes the vehicle brake lamp can be sufficiently raised.

It is desirable that a disposition direction of the light emitting portions and the non-light emitting portions be the same as a disposition direction of the striped light emitting regions and the non-light emitting regions.

In this case, since the disposition direction of the striped light emitting regions and the non-light emitting regions is coincident with the disposition direction of the light emitting portions and the non-light emitting portions in each striped light emitting region, an awareness of a warning of a viewer who visually recognizes from the rear can be increased during braking without any discomfort being felt. Particularly, in a situation in which the following vehicle gradually approaches when a preceding vehicle brakes, it is possible to shift from visual recognition of lighting in an overall stripe pattern formed by the striped light emitting regions and the non-light emitting regions to striped visual recognition of lighting within individual segments (light emitting regions) formed by the light emitting portions and the non-light emitting portions without any discomfort.

The vehicle brake lamp may further include a deceleration detection unit configured to detect a deceleration of the vehicle, and a light emission control unit configured to control light emitted from the light emitting portions, in which the light emission control unit may cause only one of the striped light emitting regions to emit light when a detected value of the deceleration detection unit is smaller than a specified value, and may cause the other striped light emitting regions to emit light in addition to the one striped light emitting region when the detected value of the deceleration detection unit is equal to or larger than the specified value.

In this case, when the deceleration of the vehicle is small (when the detected value is smaller than the specified value), since only one striped light emitting region emits light, an unnecessarily large sense of warning is not given to the driver of the following vehicle. Also, when the deceleration of the vehicle is large (the detected value is equal to or larger than the specified value), since the other striped light emitting regions also emit light in addition to the one striped light emitting region, a sufficient sense of warning can be given to the driver of the following vehicle even in a situation in which the following vehicle is at a distance.

The striped light emitting region may be a high mount stop lamp disposed at an upper portion of the vehicle separately from a main brake lamp of the vehicle, and the light emission control unit may cause only one of the striped light emitting regions at a center in a vehicle width direction to emit light when the detected value of the deceleration detection unit is smaller than the specified value, and may cause the other striped light emitting regions on an outward side in the vehicle width direction to emit light in sequence in addition to the one striped light emitting region in accordance with an increase in the detected value when the detected value of the deceleration detection unit increases to the specified value or more.

In this case, when the deceleration of the vehicle is small (when the detected value is smaller than the specified value), only one striped light emitting region at a center on an upper portion of the vehicle emits light. Therefore, the driver of the following vehicle can recognize the light emitted from the striped light emitting region as a normal high mount stop lamp without any discomfort. On the other hand, when the deceleration of the vehicle is large (the detected value is equal to or larger than the specified value), the other striped light emitting regions on an outward side in the vehicle width direction emit light in sequence in addition to the striped light emitting region at the center on the upper portion of the vehicle in accordance with the increase in the deceleration. Thereby, the light emitted from the light emitting regions (striped light emitting regions) at the upper portion of the vehicle spreads outward from the center in the vehicle width direction in accordance with the increase in the deceleration, and this can make the driver of the following vehicle more aware that a dangerous situation is approaching.

When the detected value of the deceleration detection unit is smaller than the specified value, the light emission control unit may cause an amount of light emitted from the striped light emitting region at the center in the vehicle width direction to be increased compared with that when the detected value of the deceleration detection unit is equal to larger than the specified value.

In this case, when the deceleration of the vehicle is small (when the detected value is smaller than the specified value), an amount of light emitted from the striped light emitting region at the center of the upper portion of the vehicle increases, and the light becomes more diffused around each of the strip-shaped light emitting portions within the striped light emitting region. As a result, the light emitting portions and the non-light emitting portions are less likely to be recognized as a stripe pattern, and an unnecessarily large sense of warning is not given to the driver of the following vehicle.

On the other hand, when the deceleration of the vehicle is large (when the detected value is equal to or larger than the specified value), an amount of light emitted from the striped light emitting region at the center of the upper portion of the vehicle decreases, and the light is less likely to be diffused around each of the light emitting portions within the striped light emitting region. As a result, the light emitting portions and the non-light emitting portions are easily recognized as a stripe pattern, and a sufficient sense of warning can be given to the driver of the following vehicle. At this time, although an amount of light emitted from the striped light emitting region at the center of the upper portion of the vehicle decreases, since the other striped light emitting regions emit light together, the driver of the following vehicle can reliably visually recognize a braking situation of the preceding vehicle even when the following vehicle is at a distance from the preceding vehicle.

The striped light emitting region at the center in the vehicle width direction may be set to have a larger width in the vehicle width direction than the other striped light emitting regions.

In this case, when the striped light emitting region at the center in the vehicle width direction emits light alone in a situation in which the deceleration of the vehicle is small (the detected value is smaller than the specified value), since the striped light emitting region has a larger width in the vehicle width direction than each of the other striped light emitting regions, the driver of the following vehicle can satisfactorily recognize the light emitted from the striped light emitting region.

Also, since the other striped light emitting regions each have a width in the vehicle width direction smaller than the width of the striped light emitting region at the center in the vehicle width direction, a large number of the other striped light emitting regions can be disposed within a limited space. Therefore, the driver of the following vehicle can more easily recognize the stripe pattern formed by the striped light emitting regions and the non-light emitting regions.

In the vehicle brake lamp according to the present invention, the striped light emitting regions and the non-light emitting regions are alternately disposed, and an extension width of each of the non-light emitting regions in a disposition direction is set to be larger than an extension width of each of the non-light emitting portions in the striped light emitting region in a disposition direction. Therefore, when a following vehicle is at a distance, it appears to a driver of the following vehicle that the striped light emitting regions and the non-light emitting regions emit light in a stripe pattern as a whole, and when the following vehicle is approaching, it appears to a driver of the following vehicle that the light emitting portions and the non-light emitting portions within the striped light emitting region emit light in a stripe pattern.

Therefore, when the vehicle brake lamp according to the present embodiment is employed, it is possible to make the driver of the following vehicle reliably recognize a lighting situation with a stripe pattern during braking regardless of a separation distance from the following vehicle. As a result, this can contribute to a development of a sustainable transportation system.

DETAILED DESCRIPTION OF THE INVENTION

Figure 1:
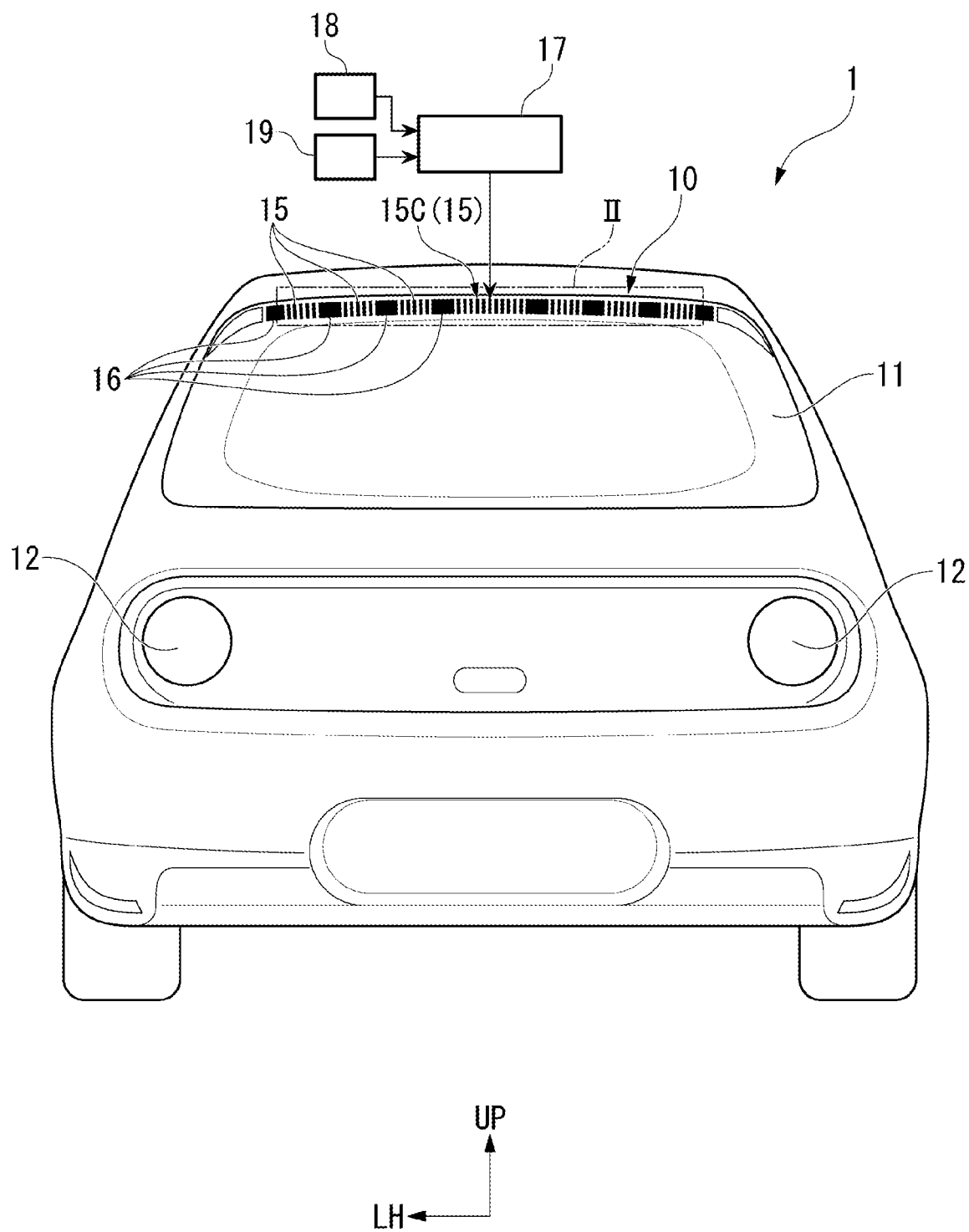
FIG. 1 is a front view of a rear part of a vehicle in which a brake lamp of an embodiment is mounted.

Hereinafter, an embodiment of the present invention will be described based on the drawings. Further, an arrow UP indicating an upward direction with respect to a vehicle and an arrow LH indicating a leftward direction with respect to the vehicle are shown at suitable positions in the drawings.

FIG. 1 is a front view of a rear part of a vehicle 1 of the present embodiment.

In FIG. 1, reference sign 10 is a vehicle brake lamp (hereinafter referred to as a "brake lamp 10") of the present embodiment, and reference sign 11 is a rear glass disposed at the rear part of the vehicle 1. A pair of main brake lamps 12 are disposed to be spaced apart in a vehicle width direction (left-right direction) on a side below the rear glass 11 at the rear part of the vehicle 1. The pair of main brake lamps 12 are disposed at left and right symmetrical positions at the rear part of the vehicle 1. The brake lamp 10 extends lengthily substantially in the vehicle width direction at an upper position on the rear glass 11. The brake lamp 10 of the present embodiment constitutes a high mount stop lamp that lights up at a position above the main brake lamps 12.

Figure 2:
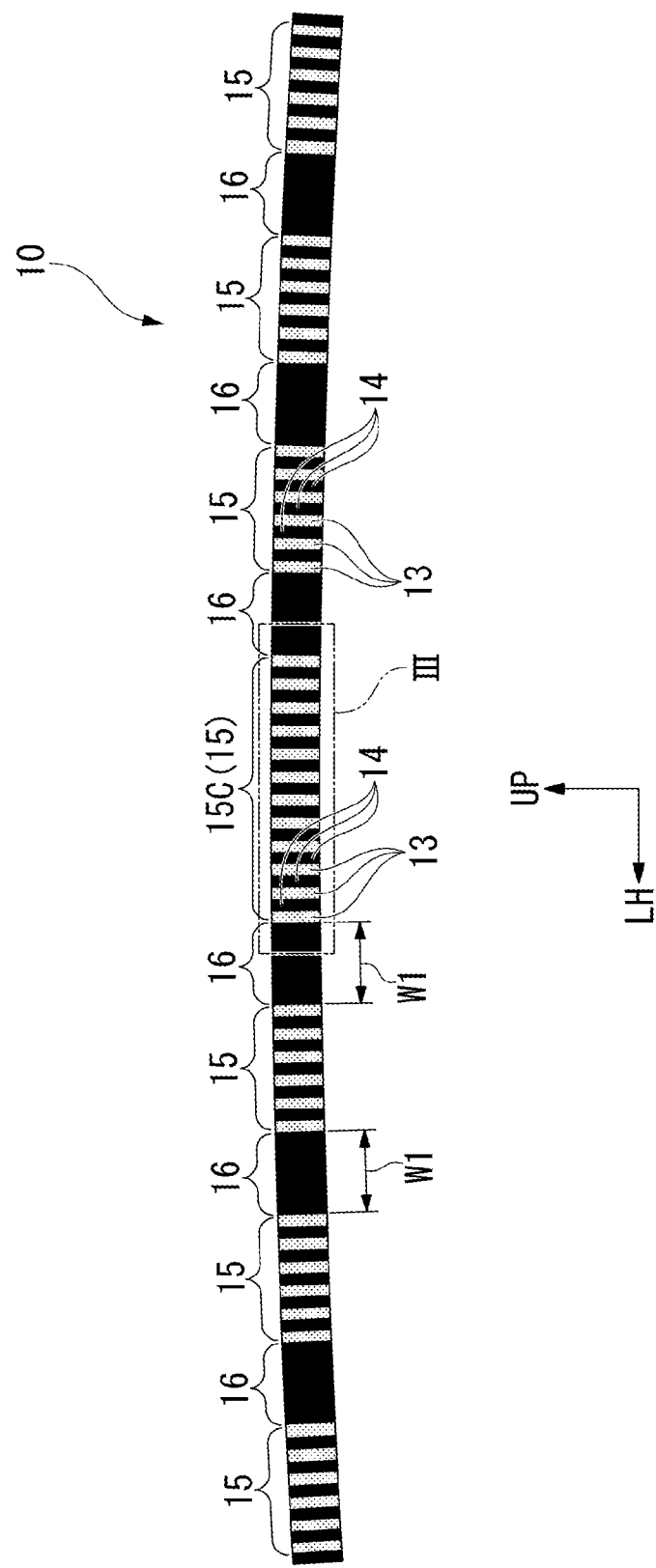
FIG. 2 is an enlarged view of part II in FIG. 1.
Figure 3:
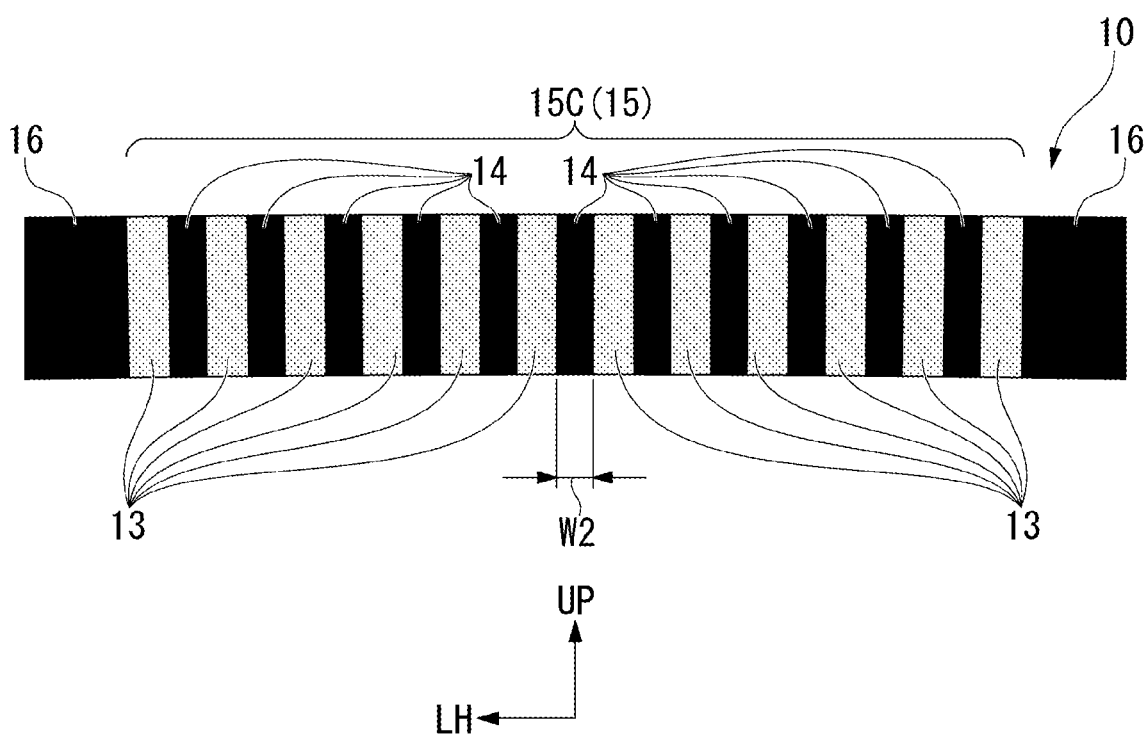
FIG. 3 is an enlarged view of part III in FIG. 2.

FIG. 2 is an enlarged view of the brake lamp 10 of part II in FIG. 1, and FIG. 3 is an enlarged view of part III in FIG. 2.

The brake lamp 10 includes a plurality of striped light emitting regions 15 having a strip-shaped light emitting portion 13 and a non-light emitting portion 14, and a plurality of non-light emitting regions 16 without a light emitting portion. The plurality of striped light emitting regions 15 and non-light emitting regions 16 are alternately disposed substantially in the vehicle width direction.

The light emitting portions 13 and the non-light emitting portions 14 of each of the striped light emitting regions 15 are each formed in a strip shape which is long in a vertical direction. In the case of the present embodiment, extension widths of the light emitting portion 13 and the non-light emitting portion 14 in the vehicle width direction are the same as each other. The light emitting portions 13 and the non-light emitting portions 14 are alternately disposed in the vehicle width direction. A plurality (a large number) of light emitting portions 13 and non-light emitting portions 14 are disposed in each of the striped light emitting regions 15. The light emitting portion 13 emits light from a light source such as an LED toward the vehicle rear side. The light source of the light emitting portion 13 is controlled by a light emission control unit 17 (see FIG. 1).

In the case of the present embodiment, a disposition direction of the light emitting portions 13 and the non-light emitting portions 14 in each of the striped light emitting regions 15 is the same as a disposition direction of the striped light emitting regions 15 and the non-light emitting regions 16 (a direction substantially in the vehicle width direction).

A brake operation detection unit 18 that detects an operation of a brake device (not shown) and a deceleration detection unit 19 that detects a deceleration of the vehicle 1 are connected to an input side of the light emission control unit 17. The light emitting portions 13 of each striped light emitting region 15 light up according to an operation of the brake device and the deceleration of the vehicle 1 as will be described in detail later. Further, the operation of the brake device includes an operation by a brake operation of a driver and an operation by an electronically controlled brake.

As shown in FIG. 1, one of the plurality of striped light emitting regions 15 is disposed at a center in the vehicle width direction. Hereinafter, the striped light emitting region 15 disposed at the center in the vehicle width direction will be referred to as a "central striped light emitting region 15C" when it is distinguished from the other striped light emitting regions 15. As shown in FIG. 2, the central striped light emitting region 15C is set to have a larger width in the vehicle width direction than each of the other striped light emitting regions 15, and is set to have a larger number of strip-shaped light emitting portions 13 than the other striped light emitting regions 15.

An extension width w1 (see FIG. 2) of the non-light emitting region 16 in the disposition direction is set to be larger than an extension width w2 (see FIG. 3) of the non-light emitting portion 14 in each striped light emitting region 15 in the disposition direction. Therefore, when the plurality of light emitting portions 13 within each of the striped light emitting regions 15 emit light, the striped light emitting regions 15 that emit light and the non-light emitting regions 16 that do not emit light appear to light up in a stripe pattern as a whole.

The light emission control unit 17 performs the following control on the light emitting portions 13 of the striped light emitting regions 15 during braking of the vehicle 1.

When a brake operation signal is input from the brake operation detection unit 18, the light emission control unit 17 determines whether or not a detected value of the deceleration detection unit 19 is smaller than a specified value. When the detected value of the deceleration detection unit 19 is smaller than the specified value, only one striped light emitting region 15 of the plurality of striped light emitting regions 15 is caused to emit light, and when the detected value of the deceleration detection unit 19 is equal to or larger than the specified value, the other striped light emitting regions 15 are caused to emit light in addition to the one striped light emitting region 15.

Figure 4A:
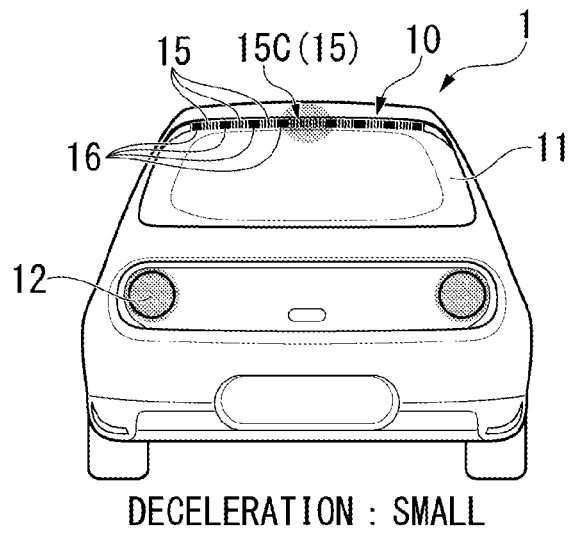
FIGS. 4A, 4B and 4C are front views of the rear part of the vehicle showing an operation state of the brake lamp of the embodiment.
Figure 4B:
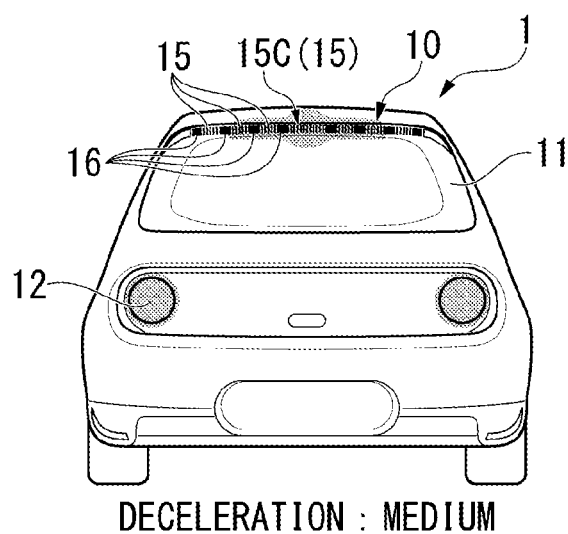
Figure 4C:
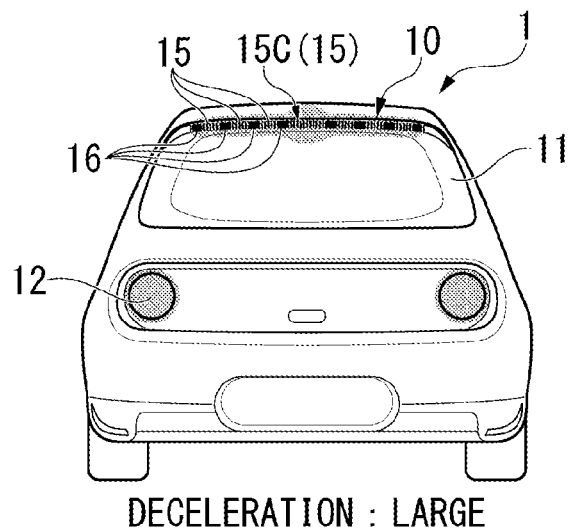

FIGS. 4A, 4B and 4C are front views of the rear part of the vehicle showing an example of an operation state of the brake lamp 10.

More specifically, when the detected value of the deceleration detection unit 19 is smaller than the specified value, the light emission control unit 17 causes only the central striped light emitting region 15C to emit light as shown in FIG. 4A. Also, when the detected value of the deceleration detection unit 19 increases to the specified value or more, the light emission control unit 17 causes the other striped light emitting regions 15 on an outward side in the vehicle width direction to emit light in sequence in addition to the central striped light emitting region 15C in accordance with the increase in the detected value as shown in FIGS. 4B and 4C. That is, as the detected value of the deceleration detection unit 19 increases (the deceleration of the vehicle increases), the striped light emitting regions 15 emitting light increase outward in the vehicle width direction in accordance with the increase in the detected value.

Also, the light emission control unit 17 changes an amount of light emitted from the central striped light emitting region 15C in accordance with the deceleration of the vehicle.

Figure 5A:
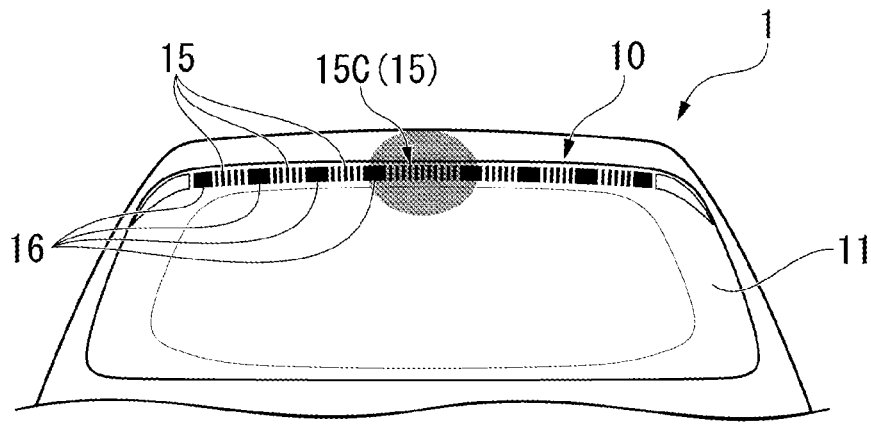
FIGS. 5A, 5B and 5C are front views of the brake lamp showing an operation state of the brake lamp of the embodiment.
Figure 5B:
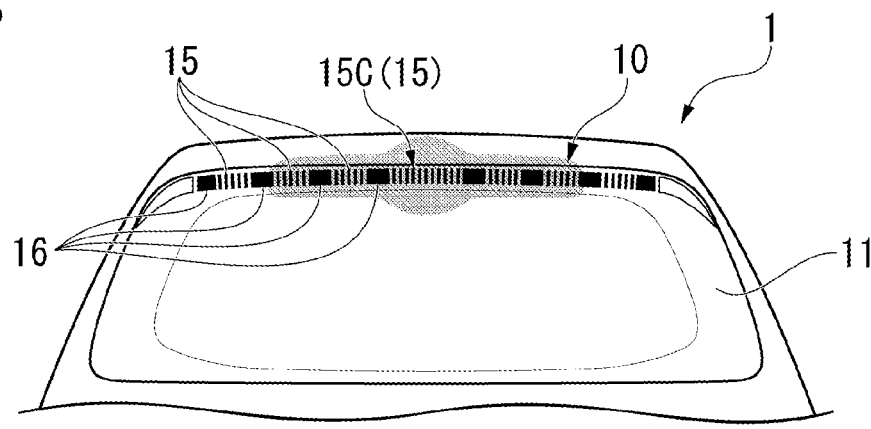
Figure 5C:
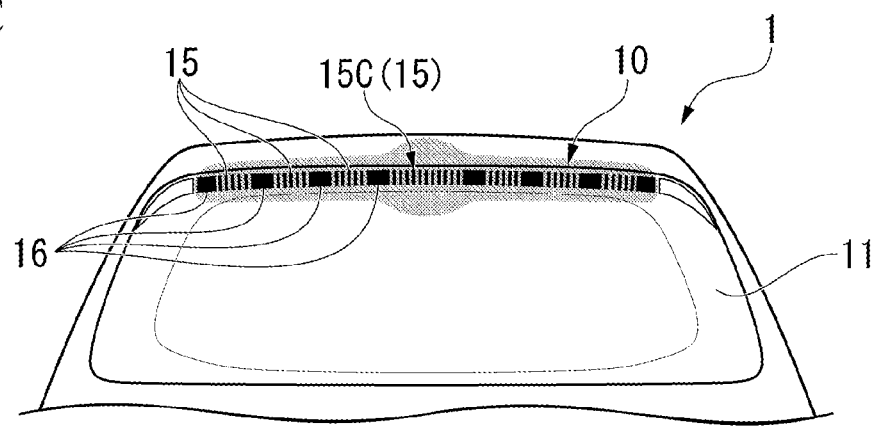

FIGS. 5A, 5B and 5C are front views of the brake lamp 10 showing an operation state of the brake lamp 10.

When the detected value of the deceleration detection unit 19 is smaller than the specified value, the light emission control unit 17 causes an amount of light emitted from the central striped light emitting region 15C to be increased compared with that when the detected value of the deceleration detection unit 19 is equal to or larger than the specified value. Therefore, as shown in FIG. 5A, when the detected value of the deceleration detection unit 19 is smaller than the specified value and the central striped light emitting region 15C emits light alone, an amount of light emitted from the central striped light emitting region 15C increases. Also, as shown in FIGS. 5B and 5C, in a situation in which the detected value of the deceleration detection unit 19 increases more than the specified value and the other striped light emitting regions 15 emit light, an amount of light emitted from the central striped light emitting region 15C decreases.

Further, an example in which only the central striped light emitting region 15C emits light when the detected value of the deceleration detection unit 19 is smaller than the specified value has been explained in the above description, the striped light emitting region 15 that emits light when the detected value of the deceleration detection unit 19 is smaller than the specified value is not limited thereto. When the detected value of the deceleration detection unit 19 is smaller than the specified value, another one of the striped light emitting regions 15 other than the central striped light emitting region 15C may be made to emit light.

As described above, in the brake lamp 10 of the present embodiment, the striped light emitting regions 15 and the non-light emitting regions 16 are alternately disposed, and the extension width w1 of the non-light emitting region 16 in the disposition direction is set to be larger than the extension width w2 of the non-light emitting portion 14 within the striped light emitting region 15 in the disposition direction. Therefore, when the light emitting portions 13 of the plurality of striped light emitting regions 15 emit light when the following vehicle is at a distance, it appears to a driver of the following vehicle that the striped light emitting regions 15 and the non-light emitting regions 16 light up in a stripe pattern as a whole. Therefore, even when the following vehicle is at a distance, it is possible to sufficiently raise an awareness of a warning of the driver in the following vehicle who visually recognizes the brake lamp 10.

Also, when the light emitting portions 13 of the striped light emitting region 15 emit light when the following vehicle is approaching, the light emitting portions 13 and the non-light emitting portions 14 within the striped light emitting region 15 appear to light up in a stripe pattern to the driver of the following vehicle. Therefore, even when the following vehicle is approaching, an awareness of a warning of the driver in the following vehicle who visually recognizes the brake lamp 10 can be sufficiently raised.

Therefore, when the brake lamp 10 of the present embodiment is employed, it is possible to make the driver of the following vehicle reliably recognize a lighting situation with a stripe pattern during braking regardless of a separation distance from the following vehicle, and this can contribute to a development of a sustainable transportation system.

Also, in the brake lamp 10 of the present embodiment, a disposition direction of the light emitting portions 13 and the non-light emitting portions 14 within the striped light emitting region 15 is the same as a disposition direction of the striped light emitting regions and the non-light emitting regions 16. Therefore, an awareness of a warning of a viewer who visually recognizes from the rear can be increased during braking without any discomfort being felt.

Particularly, in a situation in which the following vehicle gradually approaches when a preceding vehicle brakes, it is possible to shift from visual recognition of lighting in an overall stripe pattern formed by the striped light emitting regions 15 and the non-light emitting regions 16 to striped visual recognition of lighting within individual segments (light emitting regions) formed by the light emitting portions 13 and the non-light emitting portions 14 without any discomfort.

Also, in the brake lamp 10 of the present embodiment, the light emission control unit 17 causes only one of the striped light emitting regions 15 to emit light when the detected value of the deceleration detection unit 19 is smaller than the specified value, and the light emission control unit 17 causes the other striped light emitting regions 15 to emit light in addition to the one striped light emitting region 15 when the detected value of the deceleration detection unit 19 is equal to or larger than the specified value. Therefore, when the deceleration of the vehicle is small (when the detected value is smaller than the specified value), an unnecessarily large sense of warning is not given to the driver of the following vehicle, and when the deceleration of the vehicle is large (when the detected value is equal to or larger than the specified value), a sufficient sense of warning can be given to the driver of the following vehicle even in a situation in which the following vehicle is at a distance.

Also, the brake lamp 10 of the present embodiment is configured as a high mount stop lamp that is disposed at an upper portion of the vehicle separately from the main brake lamp 12 of the vehicle. Then, when the detected value of the deceleration detection unit 19 is smaller than the specified value, the light emission control unit 17 causes only the central striped light emitting region 15 to emit light. Also, when the detected value of the deceleration detection unit 19 increases to the specified value or more, the light emission control unit 17 causes the other striped light emitting regions 15 on an outward side in the vehicle width direction to emit light in sequence in addition to the central striped light emitting region 15C in accordance with the increase in the detected value. Therefore, when the deceleration of the vehicle 1 is small (when the detected value is smaller than the specified value), only the central striped light emitting region 15C emits light, and the driver in the following vehicle can recognize the light emitted from the central striped light emitting region 15C as a normal high mount stop lamp without any discomfort.

Also, when the deceleration of the vehicle 1 is large (when the detected value is equal to or larger than the specified value), the other striped light emitting regions 15 on an outward side in the vehicle width direction emit light in sequence in addition to the central striped light emitting region 15C in accordance with the increase in the deceleration, and thereby it can make the driver of the following vehicle more aware that a dangerous situation is approaching.

Further, in the brake lamp 10 of the present embodiment, when the detected value of the deceleration detection unit 19 is smaller than the specified value, the light emission control unit 17 controls an amount of light emitted from the central striped light emitting region 15C so that the amount of light emitted from the central striped light emitting region 15C is larger than that when the detected value is equal to or larger than the specified value. Therefore, when the deceleration of the vehicle 1 is small (when the detected value is smaller than the specified value), the amount of light emitted from the central striped light emitting region 15C increases, and the light becomes more diffused around each of the strip-shaped light emitting portions 13 within the striped light emitting region 15C. As a result, when the deceleration of the vehicle 1 is small, the light emitting portions 13 and the non-light emitting portions 14 are less likely to be recognized as a stripe pattern, and an unnecessarily large sense of warning is not given to the driver of the following vehicle. Also, when the deceleration of the vehicle 1 is large (when the detected value is equal to or larger than the specified value), an amount of light emitted from the central striped light emitting region 15C decreases, and the light is less likely to be diffused around each of the light emitting portions 13 within the striped light emitting region 15C. As a result, when the deceleration of the vehicle 1 is large, the light emitting portions 13 and the non-light emitting portions 14 are easily recognized as a stripe pattern, and a sufficient sense of warning can be given to the driver of the following vehicle. Further, at this time, although the amount of light emitted from the central striped light emitting region 15C decreases, since the other striped light emitting regions 15 emit light together, the driver of the following vehicle can reliably visually recognize a braking situation of the preceding vehicle even when the following vehicle is at a distance from the preceding vehicle.

Also, in the brake lamp 10 of the present embodiment, a width of the central striped light emitting region 15C in the vehicle width direction is set to be larger than a width of each of the other striped light emitting regions in the vehicle width direction. Therefore, when the central striped light emitting region 15C emits light alone in a situation in which the deceleration of the vehicle 1 is small (the detected value is smaller than the specified value), since the striped light emitting region 15C has a larger width in the vehicle width direction than each of the other striped light emitting regions 15, the driver of the following vehicle can satisfactorily recognize the light emitted from the striped light emitting region 15C.

Also, since the other striped light emitting regions 15 each have a width in the vehicle width direction smaller than the width of the central striped light emitting region 15C in the vehicle width direction, a large number of the other striped light emitting regions can be disposed within a limited space. Therefore, when this configuration is employed, the driver of the following vehicle can more easily recognizes the stripe pattern formed by the striped light emitting regions 15 and the non-light emitting regions 16.

Further, the present invention is not limited to the above-described embodiment, and various modifications can be made in design in a range without departing from the gist of the present invention. For example, in the embodiment described above, the brake lamp having the light emitting regions and the non-light emitting regions is disposed along an upper edge portion of the rear glass at the rear part of the vehicle, but a disposition of the brake lamp is not limited thereto. The brake lamp may be disposed at a position on a lower side or lateral side of the rear glass.

Also, the disposition direction of the light emitting regions and non-light emitting regions in the brake lamp is not limited to the vehicle width direction, and may be in a vertical direction or other directions. Further, a shape of the brake lamp is not limited to the linear shape, and may also be a shape having a bent portion at a part thereof such as a V shape.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

Explanation of References

10 Brake lamp
12 Main brake lamp
13 Light emitting portion
14 Non-light emitting portion
15 Striped light emitting region
16 Non-light emitting region
17 Light emission control unit
19 Deceleration detection unit
W1 Extension width of non-light emitting region in disposition direction
W2 Extension width of non-light emitting portion in disposition direction

What is claimed is:

1. A vehicle brake lamp, which is a vehicle brake lamp disposed at a rear part of a vehicle, comprising:
   a plurality of striped light emitting regions in which a plurality of strip-shaped light emitting portions and non-light emitting portions are alternately disposed;
   a plurality of non-light emitting regions without the light emitting portion;
   a deceleration detection unit configured to detect a deceleration of the vehicle; and
   a light emission control unit configured to control light emitted from the light emitting portions, wherein
   the striped light emitting regions and the non-light emitting regions are alternately disposed, and an extension width of each of the non-light emitting regions in a disposition direction is set to be larger than an extension width of each of the non-light emitting portions in the striped light emitting region in a disposition direction,
   the light emission control unit causes only one of the striped light emitting regions at a center in a vehicle width direction to emit light when the detected value of the deceleration detection unit is smaller than the specified value, and causes the other striped light emitting regions on an outward side in the vehicle width direction to emit light in sequence in addition to the one striped light emitting region in accordance with an increase in the detected value when the detected value of the deceleration detection unit increases to the specified value or more, and
   when the detected value of the deceleration detection unit is smaller than the specified value, the light emission control unit causes an amount of light emitted from the striped light emitting region at the center in the vehicle width direction to be increased compared with that when the detected value of the deceleration detection unit is equal to larger than the specified value.

2. The vehicle brake lamp according to claim 1, wherein a disposition direction of the light emitting portions and the non-light emitting portions is the same as a disposition direction of the striped light emitting regions and the non-light emitting regions.

3. The vehicle brake lamp according to claim 1, further comprising:
   a deceleration detection unit configured to detect a deceleration of the vehicle.

4. The vehicle brake lamp according to claim 1, wherein the striped light emitting region is a high mount stop lamp disposed at an upper portion of the vehicle separately from a main brake lamp of the vehicle.

5. The vehicle brake lamp according to claim 1, wherein the striped light emitting region at the center in the vehicle width direction is set to have a larger width in the vehicle width direction than the other striped light emitting regions.

* * * * *